(12) United States Patent
Kaechi

(10) Patent No.: US 8,963,924 B2
(45) Date of Patent: Feb. 24, 2015

(54) TARGET SELECTION APPARATUS THAT DETECTS TARGET, CONTROL METHOD THEREFOR, AND STORAGE MEDIUM

(75) Inventor: Shuya Kaechi, Tokyo (JP)

(73) Assignee: Canon Kabushiki Kaisha (JP)

( * ) Notice: Subject to any disclaimer, the term of this patent is extended or adjusted under 35 U.S.C. 154(b) by 383 days.

(21) Appl. No.: 13/369,360

(22) Filed: Feb. 9, 2012

(65) Prior Publication Data

US 2012/0200572 A1    Aug. 9, 2012

(30) Foreign Application Priority Data

Feb. 9, 2011    (JP) ................................. 2011-025884

(51) Int. Cl.
*G06T 11/20* (2006.01)
*G06F 3/0484* (2013.01)

(52) U.S. Cl.
CPC .................................. *G06F 3/04845* (2013.01)
USPC ......................................................... 345/442

(58) Field of Classification Search
None
See application file for complete search history.

(56) References Cited

U.S. PATENT DOCUMENTS

| 5,611,037 | A * | 3/1997 | Hayashi ........................ 345/442 |
| 6,404,434 | B1 * | 6/2002 | Shimada et al. .............. 345/442 |
| 6,975,425 | B1 * | 12/2005 | Abe et al. ..................... 358/1.18 |
| 7,034,881 | B1 | 4/2006 | Hyodo et al. |
| 7,440,594 | B2 | 10/2008 | Takenaka |
| 8,397,166 | B2 * | 3/2013 | Matsumoto ................... 715/731 |
| 2007/0198638 | A1 * | 8/2007 | Omura et al. ................. 709/204 |

FOREIGN PATENT DOCUMENTS

| JP | 58-161031 A | 9/1983 |
| JP | 11136568 A | 5/1999 |
| JP | 2004-062560 A | 2/2004 |
| JP | 2010182023 A | 8/2010 |
| JP | 2010267079 A | 11/2010 |

OTHER PUBLICATIONS

Official Action issued on JP2011-025884 mailed on Oct. 7, 2014.

\* cited by examiner

*Primary Examiner* — Ryan R Yang
(74) *Attorney, Agent, or Firm* — Rossi, Kimms & McDowell LLP

(57) ABSTRACT

A target selection apparatus capable of quickly carrying out selection processing when selecting a desired target according to a target detection result and carrying out image processing on the target. An image corresponding to image data is displayed on a display unit. A drawing line is drawn on the image displayed on the display unit. A target included in the image data is selected based on the drawing line. In response to the drawing line becoming a closed curve, the selected target is determined.

15 Claims, 32 Drawing Sheets

FIG. 4C

| FACE NUMBER | STATUS | REGION | COORDINATES | | | | |
|---|---|---|---|---|---|---|---|
| | | | CENTER | UPPER LEFT FRAME | UPPER RIGHT FRAME | LOWER RIGHT FRAME | LOWER LEFT FRAME |
| 1 | | | | | | | |
| 2 | | | | | | | |
| 3 | | | | | | | |
| 4 | | | | | | | |
| 5 | | | | | | | |
| 6 | | | | | | | |
| 7 | | | | | | | |
| .... | .... | .... | .... | .... | .... | .... | .... |
| M | | | | | | | |

FIG. 5A
FIG. 5B
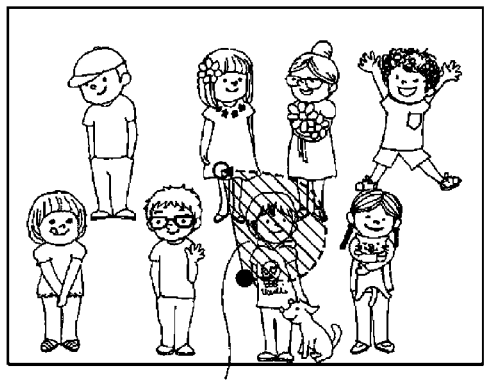
321
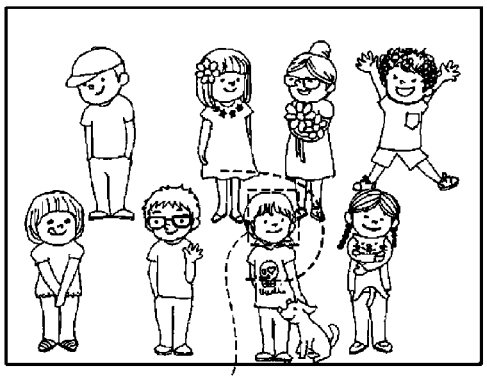
351

FIG. 5C

| FACE NUMBER | STATUS | REGION | COORDINATES | | | | |
|---|---|---|---|---|---|---|---|
| | | | CENTER | UPPER LEFT FRAME | UPPER RIGHT FRAME | LOWER RIGHT FRAME | LOWER LEFT FRAME |
| 1 | TEMPORARY | 321 | (x1,y1) | (x1lu,y1lu) | (x1ru,y1ru) | (x1rb,y1rb) | (x1lb,y1lb) |
| 2 | | | | | | | |
| 3 | | | | | | | |
| 4 | | | | | | | |
| 5 | | | | | | | |
| 6 | | | | | | | |
| 7 | | | | | | | |
| .... | .... | .... | .... | .... | .... | .... | .... |
| M | | | | | | | |

FIG. 6C

| FACE NUMBER | STATUS | REGION | COORDINATES | | | | |
|---|---|---|---|---|---|---|---|
| | | | CENTER | UPPER LEFT FRAME | UPPER RIGHT FRAME | LOWER RIGHT FRAME | LOWER LEFT FRAME |
| 1 | TEMPORARY | 321 | (x1,y1) | (x1lu,y1lu) | (x1ru,y1ru) | (x1rb,y1rb) | (x1lb,y1lb) |
| 2 | TEMPORARY | 322 | (x2,y2) | (x2lu,y2lu) | (x2ru,y2ru) | (x2rb,y2rb) | (x2lb,y2lb) |
| 3 | | | | | | | |
| 4 | | | | | | | |
| 5 | | | | | | | |
| 6 | | | | | | | |
| 7 | | | | | | | |
| .... | .... | .... | .... | .... | .... | .... | .... |
| M | | | | | | | |

FIG. 7C

| FACE NUMBER | STATUS | REGION | COORDINATES | | | | |
|---|---|---|---|---|---|---|---|
| | | | CENTER | UPPER LEFT FRAME | UPPER RIGHT FRAME | LOWER RIGHT FRAME | LOWER LEFT FRAME |
| 1 | TEMPORARY | 321 | (x1,y1) | (x1lu,y1lu) | (x1ru,y1ru) | (x1rb,y1rb) | (x1lb,y1lb) |
| 2 | TEMPORARY | 322 | (x2,y2) | (x2lu,y2lu) | (x2ru,y2ru) | (x2rb,y2rb) | (x2lb,y2lb) |
| 3 | TEMPORARY | 323 | (x3,y3) | (x3lu,y3lu) | (x3ru,y3ru) | (x3rb,y3rb) | (x3lb,y3lb) |
| 4 | TEMPORARY | 323 | (x4,y4) | (x4lu,y4lu) | (x4ru,y4ru) | (x4rb,y4rb) | (x4lb,y4lb) |
| 5 | | | | | | | |
| 6 | | | | | | | |
| 7 | | | | | | | |
| .... | .... | .... | .... | .... | .... | .... | .... |
| M | | | | | | | |

*FIG. 8A*          *FIG. 8B*
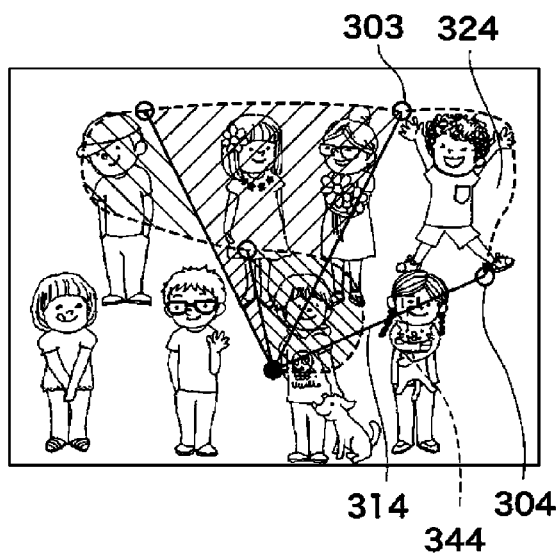
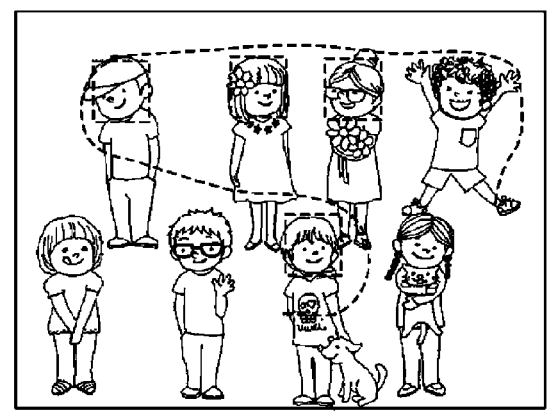

*FIG. 8C*

| FACE NUMBER | STATUS | REGION | COORDINATES | | | | |
|---|---|---|---|---|---|---|---|
| | | | CENTER | UPPER LEFT FRAME | UPPER RIGHT FRAME | LOWER RIGHT FRAME | LOWER LEFT FRAME |
| 1 | TEMPORARY | 321 | (x1,y1) | (x1lu,y1lu) | (x1ru,y1ru) | (x1rb,y1rb) | (x1lb,y1lb) |
| 2 | TEMPORARY | 322 | (x2,y2) | (x2lu,y2lu) | (x2ru,y2ru) | (x2rb,y2rb) | (x2lb,y2lb) |
| 3 | TEMPORARY | 323 | (x3,y3) | (x3lu,y3lu) | (x3ru,y3ru) | (x3rb,y3rb) | (x3lb,y3lb) |
| 4 | TEMPORARY | 323 | (x4,y4) | (x4lu,y4lu) | (x4ru,y4ru) | (x4rb,y4rb) | (x4lb,y4lb) |
| 5 | | | | | | | |
| 6 | | | | | | | |
| 7 | | | | | | | |
| .... | .... | .... | .... | .... | .... | .... | .... |
| M | | | | | | | |

FIG. 9C

| FACE NUMBER | STATUS | REGION | COORDINATES | | | | |
|---|---|---|---|---|---|---|---|
| | | | CENTER | UPPER LEFT FRAME | UPPER RIGHT FRAME | LOWER RIGHT FRAME | LOWER LEFT FRAME |
| 1 | TEMPORARY | 321 | (x1,y1) | (x1lu,y1lu) | (x1ru,y1ru) | (x1rb,y1rb) | (x1lb,y1lb) |
| 2 | TEMPORARY | 322 | (x2,y2) | (x2lu,y2lu) | (x2ru,y2ru) | (x2rb,y2rb) | (x2lb,y2lb) |
| 3 | TEMPORARY | 323 | (x3,y3) | (x3lu,y3lu) | (x3ru,y3ru) | (x3rb,y3rb) | (x3lb,y3lb) |
| 4 | TEMPORARY | 323 | (x4,y4) | (x4lu,y4lu) | (x4ru,y4ru) | (x4rb,y4rb) | (x4lb,y4lb) |
| 5 | TEMPORARY | 325 | (x5,y5) | (x5lu,y5lu) | (x5ru,y5ru) | (x5rb,y5rb) | (x5lb,y5lb) |
| 6 | TEMPORARY | 325 | (x6,y6) | (x6lu,y6lu) | (x6ru,y6ru) | (x6rb,y6rb) | (x6lb,y6lb) |
| 7 | | | | | | | |
| …. | …. | …. | …. | …. | …. | …. | …. |
| M | | | | | | | |

| FACE NUMBER | STATUS | REGION | COORDINATES | | | |
|---|---|---|---|---|---|---|
| | | | CENTER | UPPER LEFT FRAME | UPPER RIGHT FRAME | LOWER RIGHT FRAME | LOWER LEFT FRAME |
| 1 | | | | | | | |
| 2 | FULL-SCALE | 322 | (x2,y2) | (x2lu,y2lu) | (x2ru,y2ru) | (x2rb,y2rb) | (x2lb,y2lb) |
| 3 | FULL-SCALE | 323 | (x3,y3) | (x3lu,y3lu) | (x3ru,y3ru) | (x3rb,y3rb) | (x3lb,y3lb) |
| 4 | FULL-SCALE | 323 | (x4,y4) | (x4lu,y4lu) | (x4ru,y4ru) | (x4rb,y4rb) | (x4lb,y4lb) |
| 5 | FULL-SCALE | 325 | (x5,y5) | (x5lu,y5lu) | (x5ru,y5ru) | (x5rb,y5rb) | (x5lb,y5lb) |
| 6 | FULL-SCALE | 325 | (x6,y6) | (x6lu,y6lu) | (x6ru,y6ru) | (x6rb,y6rb) | (x6lb,y6lb) |
| 7 | | | | | | | |
| .... | .... | .... | .... | .... | .... | .... | .... |
| M | | | | | | | |

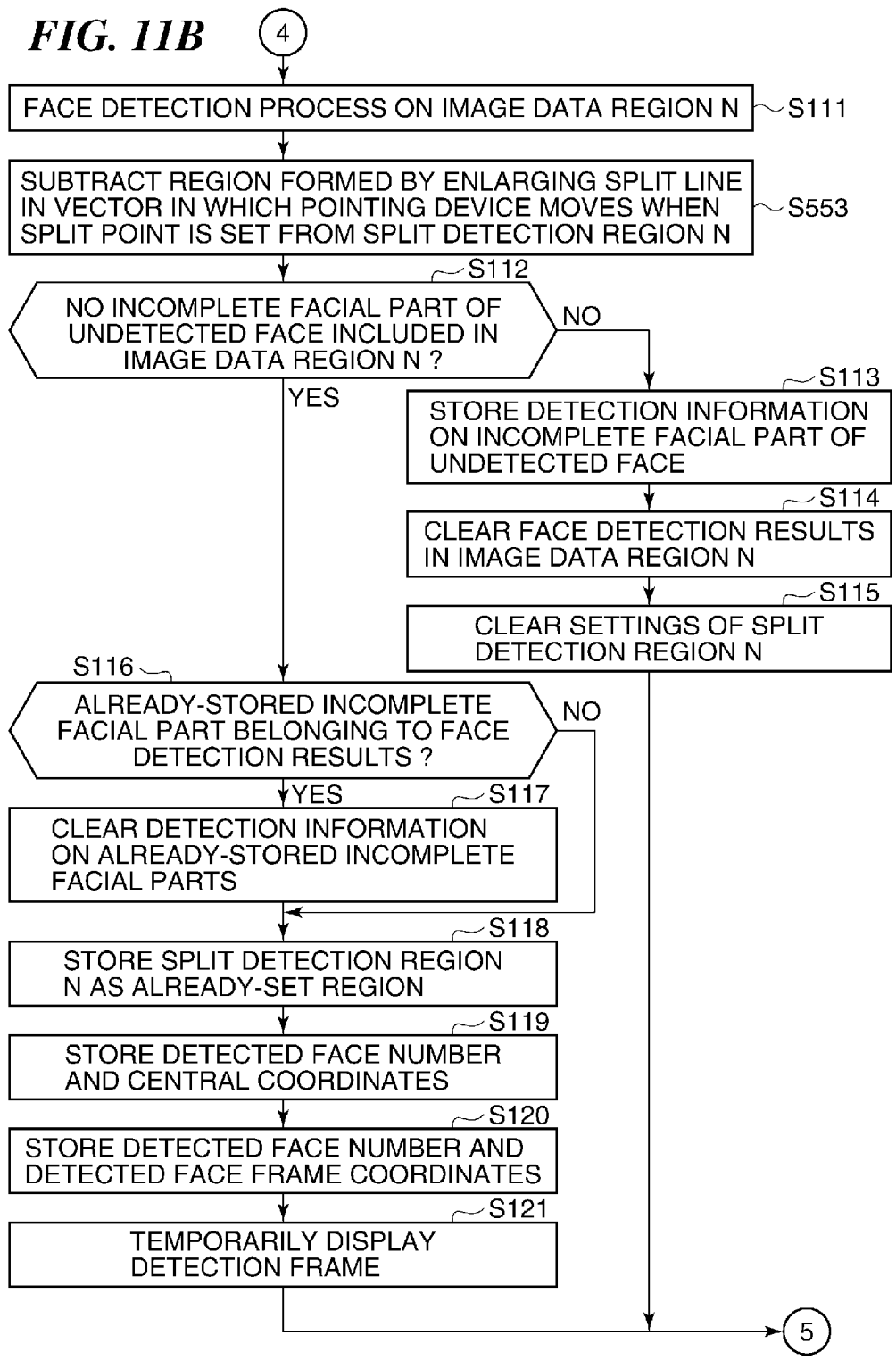

FIG. 12C

| FACE NUMBER | STATUS | REGION | COORDINATES |||||
| --- | --- | --- | --- | --- | --- | --- | --- |
| | | | CENTER | UPPER LEFT FRAME | UPPER RIGHT FRAME | LOWER RIGHT FRAME | LOWER LEFT FRAME |
| 1 | TEMPORARY | 371 | (x1,y1) | (x1lu,y1lu) | (x1ru,y1ru) | (x1rb,y1rb) | (x1lb,y1lb) |
| 2 | | | | | | | |
| 3 | | | | | | | |
| 4 | | | | | | | |
| 5 | | | | | | | |
| 6 | | | | | | | |
| 7 | | | | | | | |
| .... | .... | .... | .... | .... | .... | .... | .... |
| M | | | | | | | |

*FIG. 13A*  *FIG. 13B*
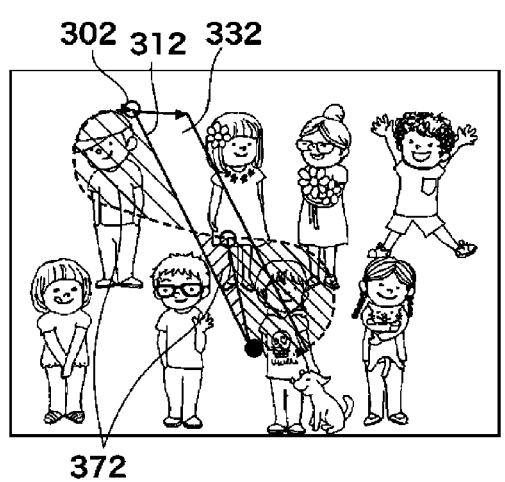
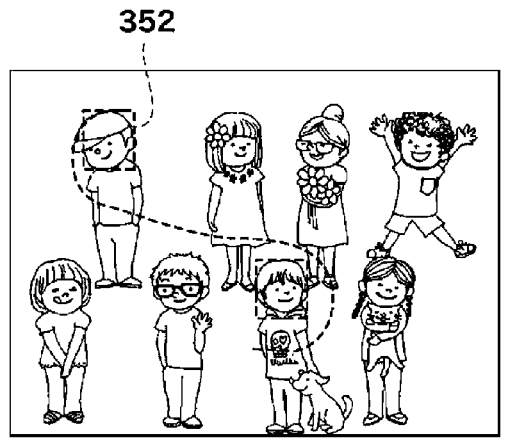

FIG. 13C

| FACE NUMBER | STATUS | REGION | COORDINATES | | | | |
|---|---|---|---|---|---|---|---|
| | | | CENTER | UPPER LEFT FRAME | UPPER RIGHT FRAME | LOWER RIGHT FRAME | LOWER LEFT FRAME |
| 1 | TEMPORARY | 371 | (x1,y1) | (x1lu,y1lu) | (x1ru,y1ru) | (x1rb,y1rb) | (x1lb,y1lb) |
| 2 | TEMPORARY | 372 | (x2,y2) | (x2lu,y2lu) | (x2ru,y2ru) | (x2rb,y2rb) | (x2lb,y2lb) |
| 3 | | | | | | | |
| 4 | | | | | | | |
| 5 | | | | | | | |
| 6 | | | | | | | |
| 7 | | | | | | | |
| .... | .... | .... | .... | .... | .... | .... | .... |
| M | | | | | | | |

FIG. 14C

| FACE NUMBER | STATUS | REGION | COORDINATES | | | | |
|---|---|---|---|---|---|---|---|
| | | | CENTER | UPPER LEFT FRAME | UPPER RIGHT FRAME | LOWER RIGHT FRAME | LOWER LEFT FRAME |
| 1 | TEMPORARY | 371 | (x1,y1) | (x1lu,y1lu) | (x1ru,y1ru) | (x1rb,y1rb) | (x1lb,y1lb) |
| 2 | TEMPORARY | 372 | (x2,y2) | (x2lu,y2lu) | (x2ru,y2ru) | (x2rb,y2rb) | (x2lb,y2lb) |
| 3 | TEMPORARY | 373 | (x3,y3) | (x3lu,y3lu) | (x3ru,y3ru) | (x3rb,y3rb) | (x3lb,y3lb) |
| 4 | TEMPORARY | 373 | (x4,y4) | (x4lu,y4lu) | (x4ru,y4ru) | (x4rb,y4rb) | (x4lb,y4lb) |
| 5 | | | | | | | |
| 6 | | | | | | | |
| 7 | | | | | | | |
| .... | .... | .... | .... | .... | .... | .... | .... |
| M | | | | | | | |

FIG. 15C

| FACE NUMBER | STATUS | REGION | COORDINATES | | | | |
|---|---|---|---|---|---|---|---|
| | | | CENTER | UPPER LEFT FRAME | UPPER RIGHT FRAME | LOWER RIGHT FRAME | LOWER LEFT FRAME |
| 1 | TEMPORARY | 371 | (x1,y1) | (x1lu,y1lu) | (x1ru,y1ru) | (x1rb,y1rb) | (x1lb,y1lb) |
| 2 | TEMPORARY | 372 | (x2,y2) | (x2lu,y2lu) | (x2ru,y2ru) | (x2rb,y2rb) | (x2lb,y2lb) |
| 3 | TEMPORARY | 373 | (x3,y3) | (x3lu,y3lu) | (x3ru,y3ru) | (x3rb,y3rb) | (x3lb,y3lb) |
| 4 | TEMPORARY | 373 | (x4,y4) | (x4lu,y4lu) | (x4ru,y4ru) | (x4rb,y4rb) | (x4lb,y4lb) |
| 5 | TEMPORARY | 374 | (x5,y5) | (x5lu,y5lu) | (x5ru,y5ru) | (x5rb,y5rb) | (x5lb,y5lb) |
| 6 | TEMPORARY | 374 | (x6,y6) | (x6lu,y6lu) | (x6ru,y6ru) | (x6rb,y6rb) | (x6lb,y6lb) |
| 7 | | | | | | | |
| .... | .... | | | | | | |
| M | | | | | | | |

FIG. 16C

| FACE NUMBER | STATUS | REGION | COORDINATES | | | | |
|---|---|---|---|---|---|---|---|
| | | | CENTER | UPPER LEFT FRAME | UPPER RIGHT FRAME | LOWER RIGHT FRAME | LOWER LEFT FRAME |
| 1 | TEMPORARY | 371 | (x1,y1) | (x1lu,y1lu) | (x1ru,y1ru) | (x1rb,y1rb) | (x1lb,y1lb) |
| 2 | TEMPORARY | 372 | (x2,y2) | (x2lu,y2lu) | (x2ru,y2ru) | (x2rb,y2rb) | (x2lb,y2lb) |
| 3 | TEMPORARY | 373 | (x3,y3) | (x3lu,y3lu) | (x3ru,y3ru) | (x3rb,y3rb) | (x3lb,y3lb) |
| 4 | TEMPORARY | 373 | (x4,y4) | (x4lu,y4lu) | (x4ru,y4ru) | (x4rb,y4rb) | (x4lb,y4lb) |
| 5 | TEMPORARY | 374 | (x5,y5) | (x5lu,y5lu) | (x5ru,y5ru) | (x5rb,y5rb) | (x5lb,y5lb) |
| 6 | TEMPORARY | 374 | (x6,y6) | (x6lu,y6lu) | (x6ru,y6ru) | (x6rb,y6rb) | (x6lb,y6lb) |
| 7 | | | | | | | |
| .... | .... | .... | .... | .... | .... | .... | .... |
| M | | | | | | | |

TARGET SELECTION APPARATUS THAT DETECTS TARGET, CONTROL METHOD THEREFOR, AND STORAGE MEDIUM

BACKGROUND OF THE INVENTION

1. Field of the Invention

The present invention relates to a target selection apparatus for detecting a target such as a face, a control method therefor, and a computer-readable storage medium storing a control program for implementing the method.

2. Description of the Related Art

In recent years, devices handling digital image data such as digital photo printers and digital still cameras have become widespread, and some of these devices have the function of detecting a human face as a target in image data (face detecting function). An application that carries out specific image processing on a face part of a person detected by the face detecting function has been proposed.

Further, by objectifying data on a face part (face data) using face detection results, the face data may be applied to purposes other than image processing such as database compilation or personal authentication.

An example of conventional face detecting functions is to collectively read image data, collectively carry out face detection processing on the entire region of the image data, and then display the detection result.

As for image data, there may be a face part desired to be processed and a face part undesired to be processed. It is thus necessary to select a face part from a face detection result. Examples of selection methods therefor include a method that a face part as an object of image processing is selected from a face detection result and a method that a face part matching a specific face part is selected from a face detection result.

Moreover, there is a method that data associated with a face part is regarded as a part of entire image data, and an image associated with a face part is selected. Here, image information such as characters and texts is stored in an image storage device, and a part of image information displayed on a display is indicated by a closed curve using a light pen or the like. Then, information indicative of the inside/outside of the closed curve (inside/outside information) is created using a closed curve inside recognition device and stored in the image storage device, and an image of a part specified as a result of logical operation of the image information and the inside/outside information is selected (see Japanese Laid-Open Patent Publication (Kokai) No. S58-161031).

According to Japanese Laid-Open Patent Publication (Kokai) No. 2004-62560, however, it is necessary to register specific face parts (face images of persons) in advance. Then, it is necessary to compare a detected face image and the face images registered in advance and determine whether or not there is a match. For this reason, when selection is to be carried out for image data in which an unspecified number of people show up, immediacy is compromised.

Moreover, according to Japanese Laid-Open Patent Publication (Kokai) No. S58-161031, a part of an image cannot be specified until the formation of a closed curve or the like using a light pen is completed. Thus, it takes time to switch from the selection of a part of an image to the next processing, for example, image processing on the selected part of the image.

SUMMARY OF THE INVENTION

The present invention provides a target selection apparatus capable of quickly carrying out selection processing when selecting a desired target according to a target detection result and carrying out image processing on the target, a control method therefor, and a computer-readable storage medium storing a control program for implementing the method.

Accordingly, a first aspect of the present invention provides a target selection apparatus that selects a target from image data including a plurality of targets, comprising a display control unit configured to display an image corresponding to the image data on a display unit, a drawing unit configured to draw a drawing line on the image displayed on the display unit, and a selection unit configured to select the target included in the image data based on the drawing line drawn by the drawing unit, wherein in response to the drawing line drawn by the drawing unit becoming a closed curve, the target selected by the selection unit is determined.

Accordingly, a second aspect of the present invention provides a control method for a target selection apparatus that selects a target from image data including a plurality of targets, comprising a display control step of displaying an image corresponding to the image data on a display unit, a drawing step of drawing a drawing line on the image displayed on the display unit, and a selection step of selecting the target included in the image data based on the drawing line drawn in the drawing unit, wherein in response to the drawing line drawn by the drawing step becoming a closed curve, the target selected in the selection unit is determined.

Accordingly, a third aspect of the present invention provides a computer-readable non-transitory storage medium storing a control program for implementing a control method used for a target selection apparatus that selects a target from image data including a plurality of targets, the method comprising a display control step of displaying an image corresponding to the image data on a display unit, a drawing step of drawing a drawing line on the image displayed on the display unit, and a selection step of selecting the target included in the image data based on the drawing line drawn in the drawing unit, wherein in response to the drawing line drawn by the drawing step becoming a closed curve, the target selected in the selection unit is determined.

According to the present invention, selection processing can be quickly carried out when a desired target is selected according to a target detection result, and image processing is carried out on the target.

Further features of the present invention will become apparent from the following description of exemplary embodiments (with reference to the attached drawings).

BRIEF DESCRIPTION OF THE DRAWINGS

FIGS. 4A to 4C are views useful in explaining the concept of a face predictive detection process described with reference to FIGS. 3A to 3D, in which FIG. 4A shows the progression of image processing, FIG. 4B shows the progression of display, and FIG. 4C shows the progression of face detection results.

FIGS. 5A to 5C are views useful in explaining the concept of the face predictive detection process described with reference to FIGS. 3A to 3D, in which FIG. 5A shows the progression of image processing, FIG. 5B shows the progression of display, and FIG. 5C shows the progression of face detection results.

FIGS. 6A to 6C are views useful in explaining the concept of the face predictive detection process described with reference to FIGS. 3A to 3D, in which FIG. 6A shows the progression of image processing, FIG. 6B shows the progression of display, and FIG. 6C shows the progression of face detection results.

FIGS. 7A to 7C are views useful in explaining the concept of the face predictive detection process described with reference to FIGS. 3A to 3D, in which FIG. 7A shows the progression of image processing, FIG. 7B shows the progression of display, and FIG. 7C shows the progression of face detection results.

FIGS. 8A to 8C are views useful in explaining the concept of the face predictive detection process described with reference to FIGS. 3A to 3D, in which FIG. 8A shows the progression of image processing, FIG. 8B shows the progression of display, and FIG. 8C shows the progression of face detection results.

FIGS. 9A to 9C are views useful in explaining the concept of the face predictive detection process described with reference to FIGS. 3A to 3D, in which FIG. 9A shows the progression of image processing, FIG. 9B shows the progression of display, and FIG. 9C shows the progression of face detection results.

FIGS. 10A to 10C are views useful in explaining the concept of a face predictive detection process described with reference to FIGS. 3A to 3D, in which FIG. 10A shows the progression of image processing, FIG. 10B shows the progression of display, and FIG. 10C shows the progression of face detection results.

FIGS. 11A and 11B are flowcharts useful in explaining a process to display face detection results when a curve with coordinates corresponding to image data is drawn using the pointing device appearing in FIG. 1 in a second embodiment of the present invention.

FIGS. 12A to 12C are views useful in explaining the concept of a face predictive detection process described with reference to FIGS. 11A and 11B, in which FIG. 12A shows the progression of image processing, FIG. 12B shows the progression of display, and FIG. 12C shows the progression of face detection results.

FIGS. 13A to 13C are views useful in explaining the concept of the face predictive detection process described with reference to FIGS. 11A and 11B, in which FIG. 13A shows the progression of image processing, FIG. 13B shows the progression of display, and FIG. 13C shows the progression of face detection results.

FIGS. 14A to 14C are views useful in explaining the concept of the face predictive detection process described with reference to FIGS. 11A and 11B, in which FIG. 14A shows the progression of image processing, FIG. 14B shows the progression of display, and FIG. 14C shows the progression of face detection results.

FIGS. 15A to 15C are views useful in explaining the concept of the face predictive detection process described with reference to FIGS. 11A and 11B, in which FIG. 15A shows the progression of image processing, FIG. 15B shows the progression of display, and FIG. 15C shows the progression of face detection results.

FIGS. 16A to 16C are views useful in explaining the concept of the face predictive detection process described with reference to FIGS. 11A and 11B, in which FIG. 16A shows the progression of image processing, FIG. 16B shows the progression of display, and FIG. 16C shows the progression of face detection results.

DESCRIPTION OF THE EMBODIMENTS

A description will now be given of a target selection apparatus according to embodiments of the present invention with reference to the drawings. It should be noted that in the embodiments, an input using a pointing device is explained with the word "curve", but this is synonymous with the word "path". It should be noted that in the following description, a face is given as an example of targets.

Figure 1:
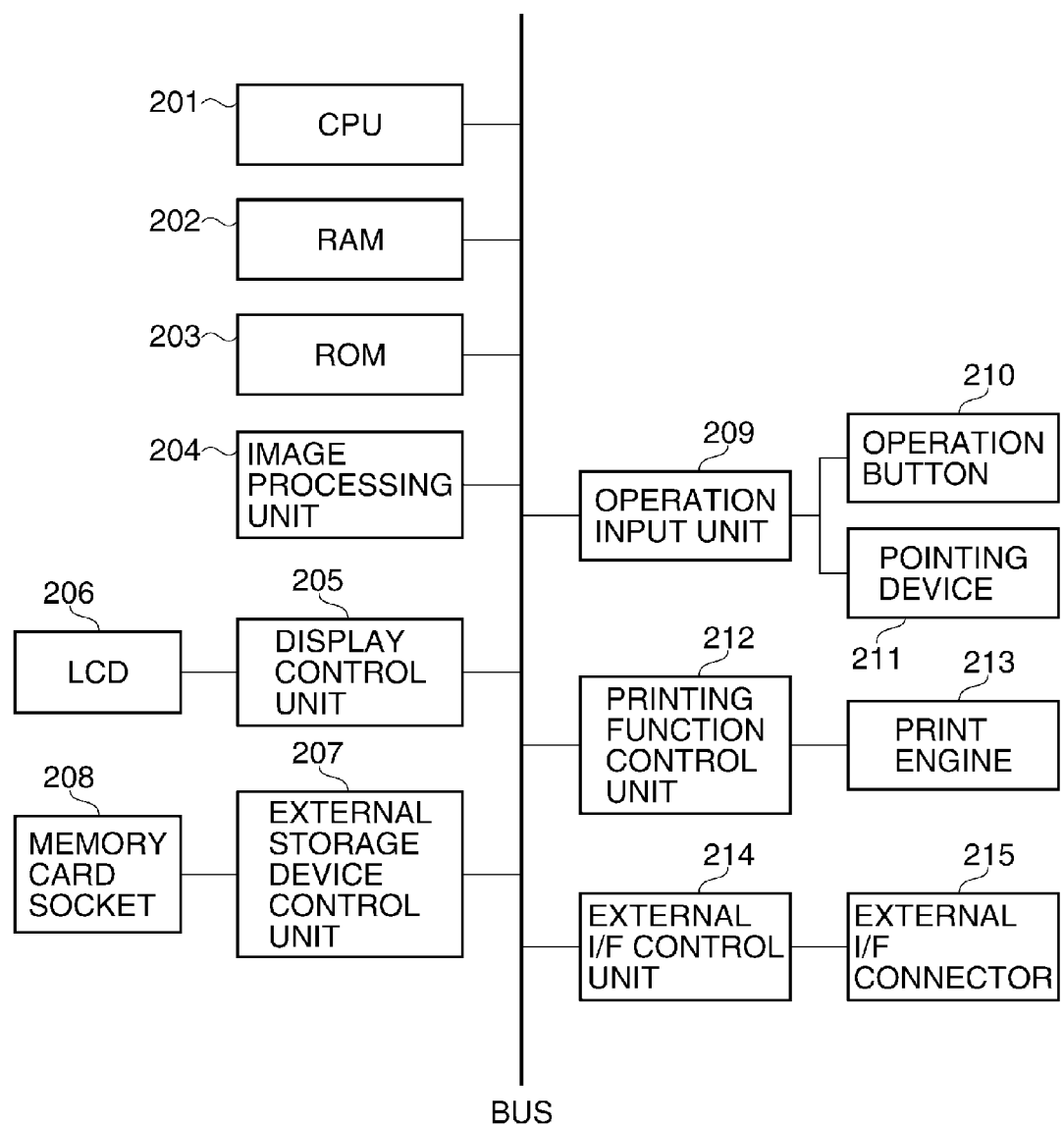
FIG. 1 is a block diagram showing an exemplary printing apparatus in which a face detection unit according to a first embodiment of the present invention is used.

FIG. 1 is a block diagram showing an exemplary printing apparatus in which a face detection unit according to a first embodiment of the present invention is used.

The printing apparatus shown in the figure has a CPU (central processing unit) 201, which is responsible for controlling the entire printing apparatus. A RAM (random access memory) 202 is used as a work area for the CPU 201. A ROM (read only memory) 203 stores processing procedures which are executed by the CPU 201, and for example, a rewritable nonvolatile memory such as a flash memory is used as the ROM 203.

An image processing unit 204 carries out a process to convert digital image data (hereafter referred to merely as image data) into data that can be screen-displayed, and a process to detect facial parts (face parts) in image data. An LCD (liquid crystal display) 206 is connected to a display control unit 205, which screen-displays image data, operating information, and so forth on the LCD 206.

In the example shown in the figure, a memory socket 208 is connected to an external storage device control unit 207, and for example, a card storage medium (not shown) is inserted into the memory socket 208. The external storage device control unit 207 performs control to read image data stored in the card storage medium, and performs control to write image data in the card storage medium.

An operation button 210 and a pointing device 211 are connected to an operation input unit 209, which sends inputs from the operation button 210 and the pointing device 211 as operating information to the CPU 201. It should be noted that the pointing device 211 has only to be a device capable of obtaining coordinate information, and a touch panel and a mouse correspond to the pointing device 211.

A printing function control unit 212 performs printing by controlling a print engine 213 according to image data. An external I/F connector is connected to an external interface (I/F) control unit 214. An external I/F is, for example, a USB I/F, and the external I/F control unit 214 is connected to an external device via an external I/F 215. Another pointing device, for example, may be connected as the external device.

Figure 2:
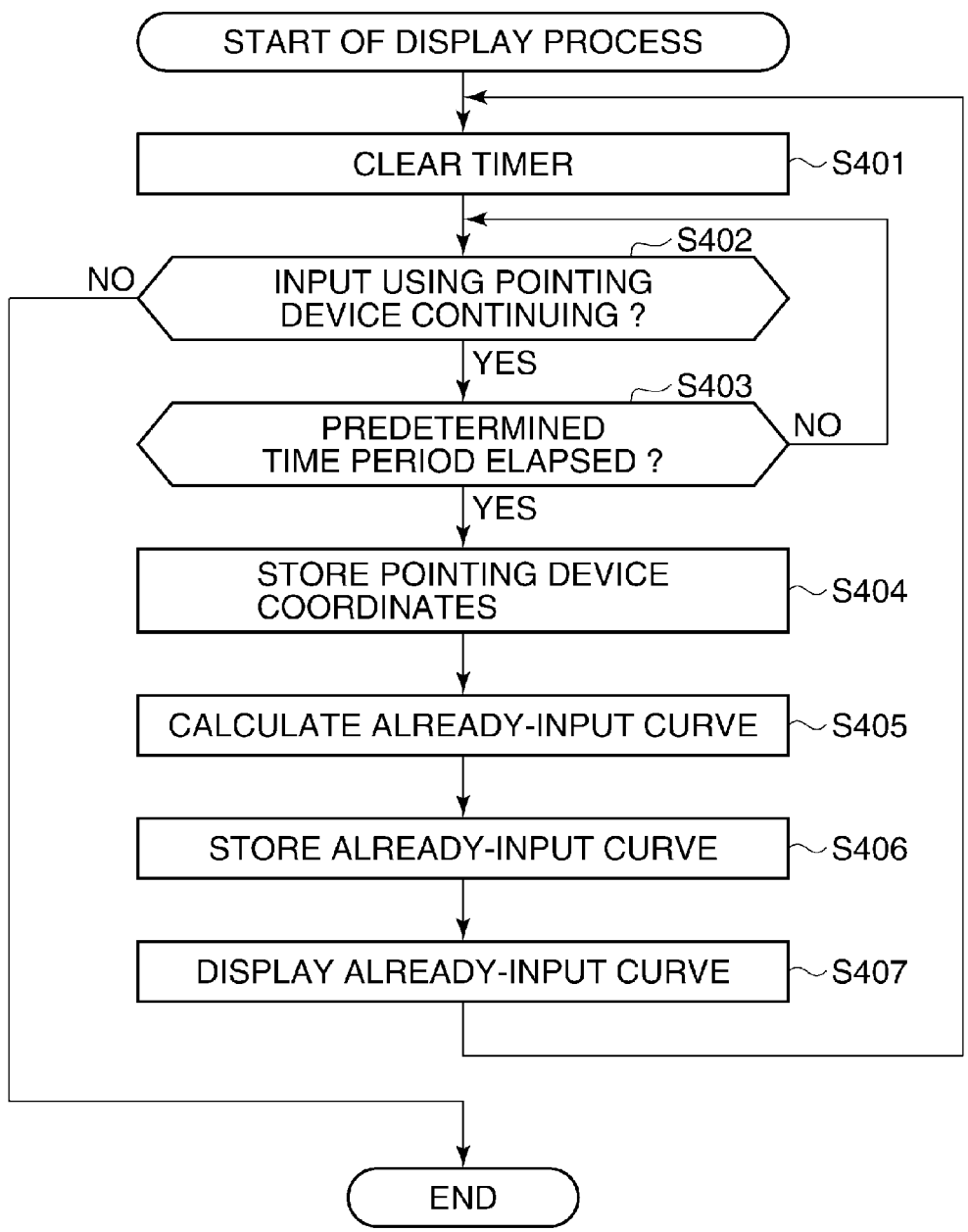
FIG. 2 is a flowchart useful in explaining a process to display coordinate values and an already-input curve when coordinates are input using a pointing device appearing in FIG. 1.
Figure 3A:
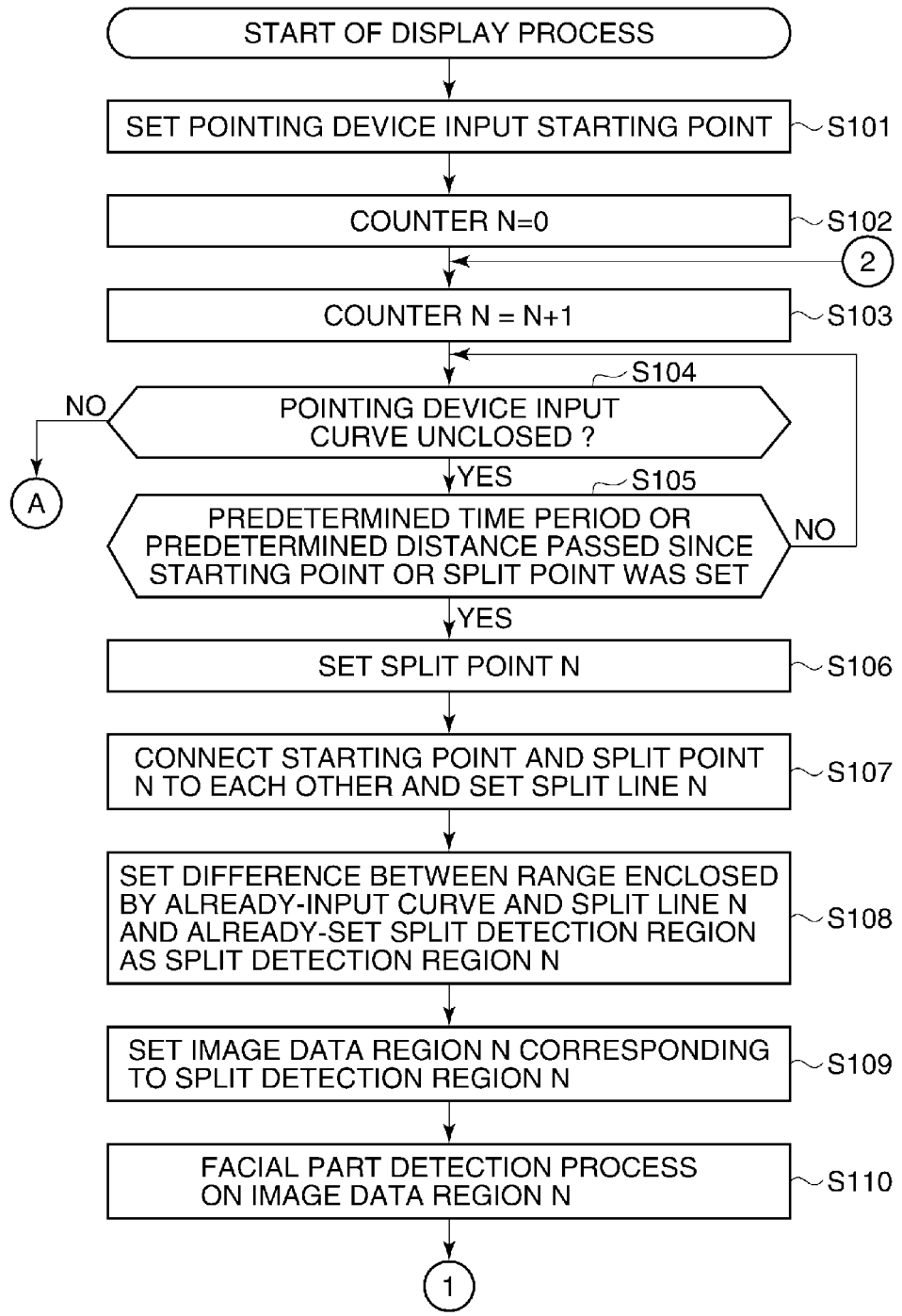
FIGS. 3A to 3D are flowcharts useful in explaining a process to display face detection results when a curve with coordinates corresponding to image data is drawn using the pointing device appearing in FIG. 1 in the first embodiment of the present invention.
Figure 3B:
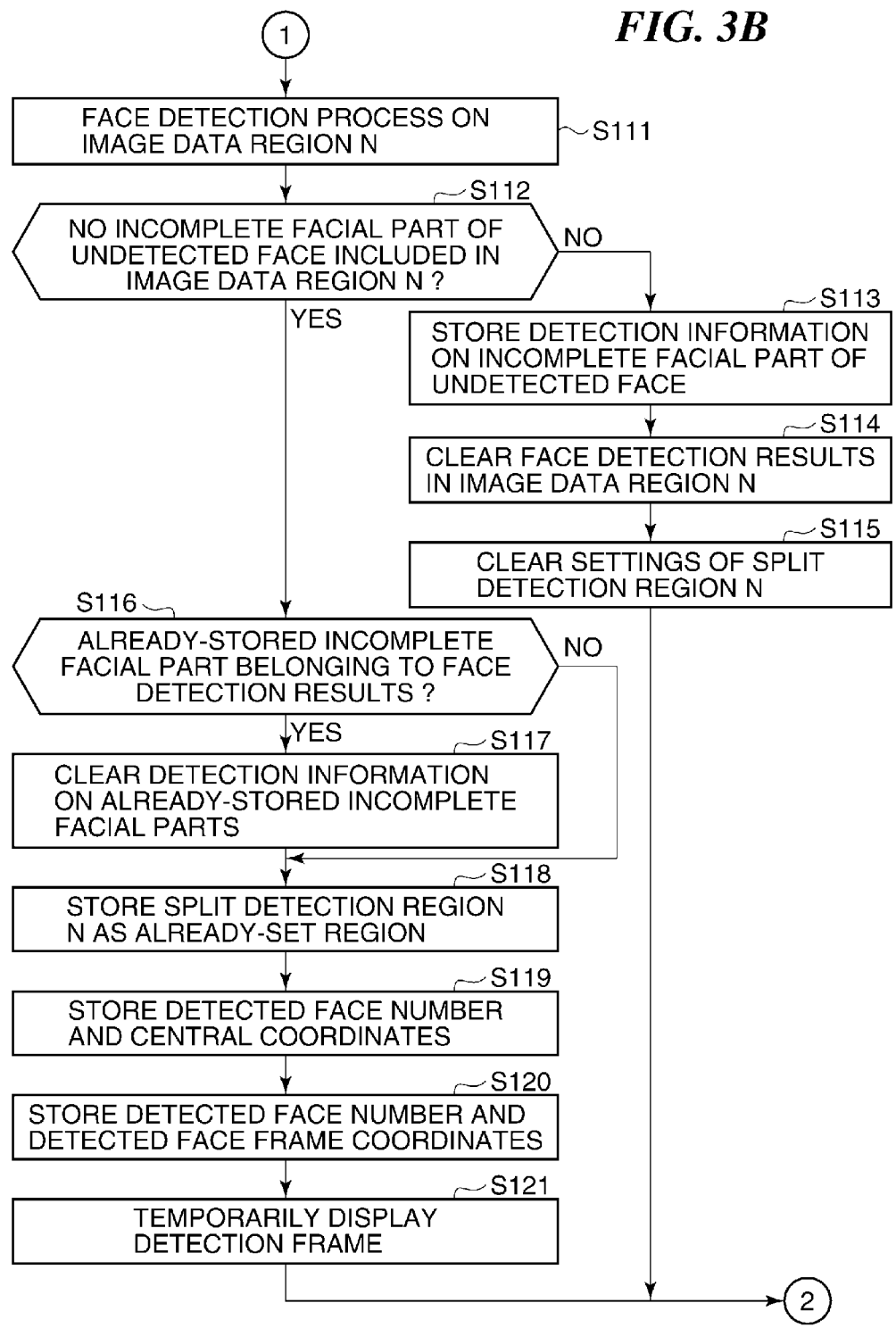
Figure 3C:
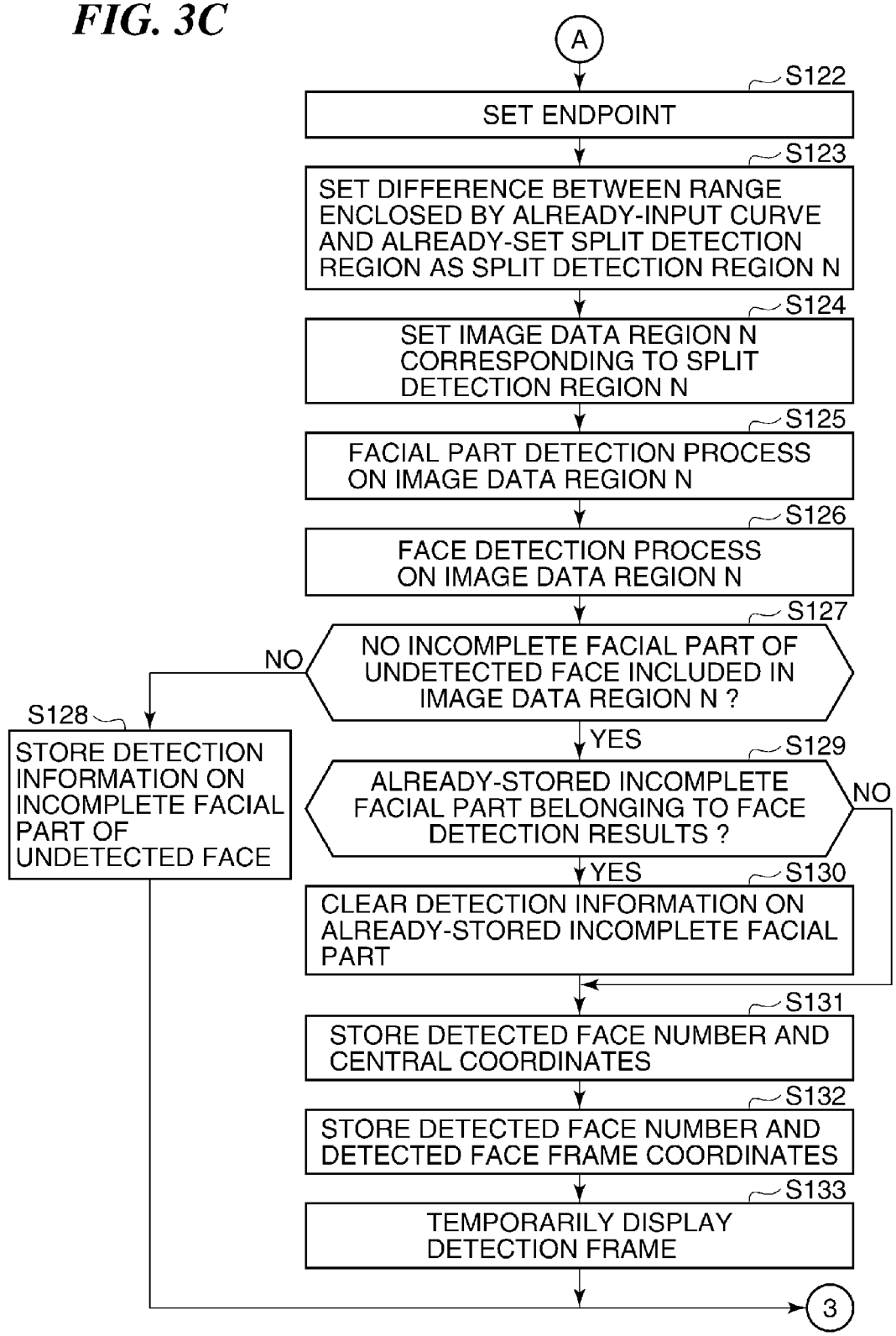
Figure 3D:
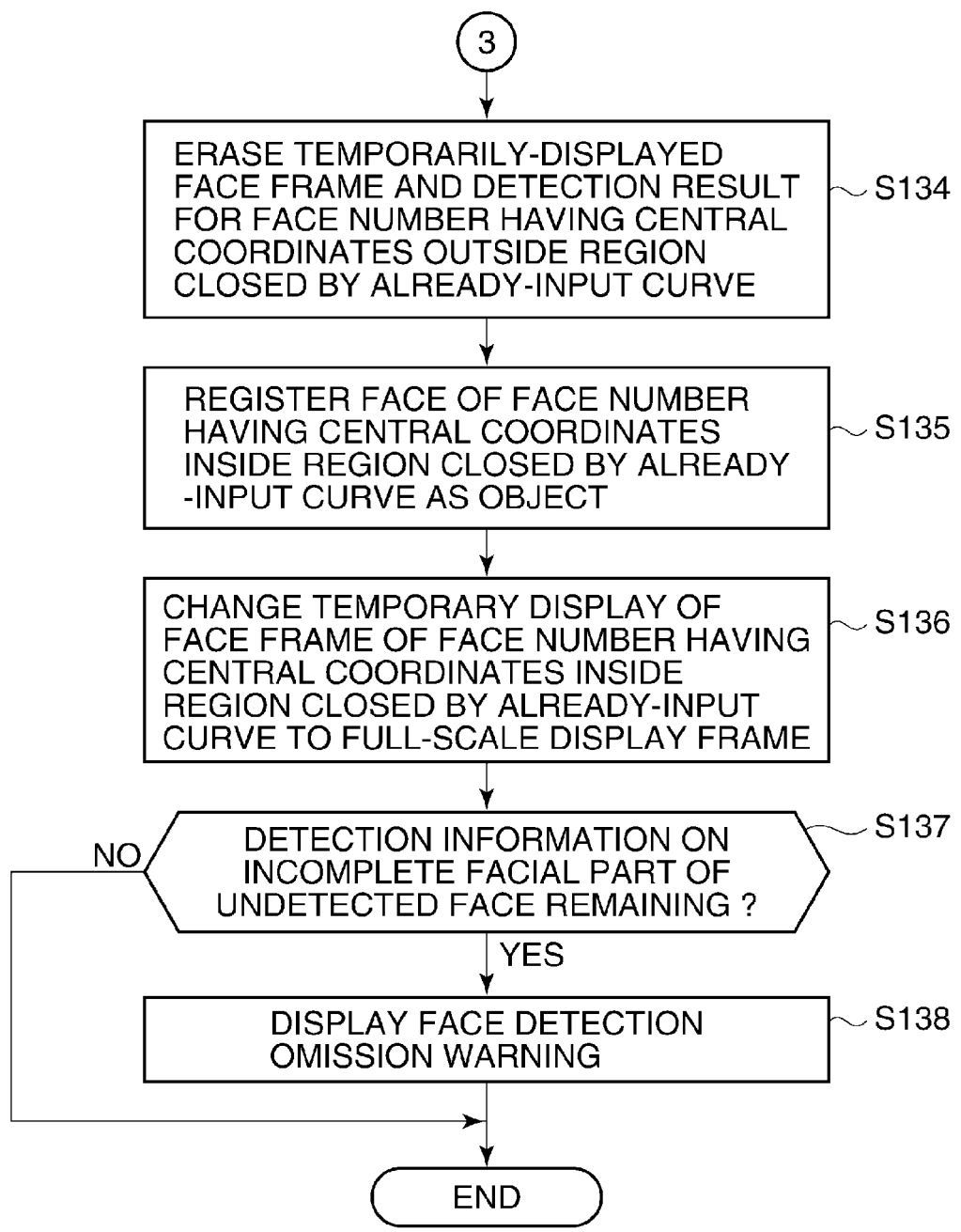

FIG. 2 is a flowchart useful in explaining a process to display coordinate values and an already-input curve when coordinates are input using the pointing device 211 appearing in FIG. 1. It should be noted that the process to display pointing device inputs and already-input curves explained with reference to FIG. 2 is generally known, and therefore, only a brief description thereof will be given here.

Referring to FIGS. 1 and 2, when input of a curve is started using the pointing device 211, the CPU 201 clears a built-in timer (step S401). The CPU 201 then determines whether or not the input using the pointing device 211 is continuing (step S402). When the input using the pointing device 211 is continuing (YES in the step S402), the CPU 201 determines whether or not a fixed time period (predetermined time period) has elapsed since the built-in timer was cleared (step S403).

When the predetermined time period has not elapsed (NO in the step S403), the CPU 201 returns to the process in the step S402. On the other hand, when the predetermined time period has elapsed (YES in the step S403), the CPU 201 temporarily stores coordinate values input using the pointing device 211 in the RAM 202 (step S404). After that, the CPU 201 obtains a curve according to the coordinate values stored in the RAM 202 to obtain an already-input curve (step S405). The CPU 201 temporarily stores the already-input curve as already-input curve storage values in the RAM 202 (step S406), and causes the display control unit 205 to display the already-input curve on the LCD 206 (step S407). Then, the CPU 401 returns to the step S401.

In the step S402, when the input using the pointing device 211 is not continuing (NO in the step S402), the CPU 201 determines that the input using the pointing device 211 has been completed, and terminates the process.

FIGS. 3A to 3D are flowcharts useful in explaining a process to display face detection results (target detection results) when a curve with coordinates corresponding to image data is drawn using the pointing device 211 appearing in FIG. 1 in the first embodiment of the present invention.

Referring to FIGS. 3A to 3D, the user uses the pointing device 211 to draw a curve of coordinates corresponding to image data, a face predictive detection process is carried out step by step until the curve is closed, and face detection results (target detection result) are displayed. It should be noted that the display process described above with reference to FIG. 2 and the display process described hereafter with reference to FIGS. 3A to 3D are carried out in parallel independently of each other, and the already-input curve stored value described above with reference to FIG. 2 are used for the face predictive detection process described hereafter with reference to FIGS. 3A to 3D.

Referring to FIGS. 1 and 3A to 3D, it is assumed here that image data is stored on a card recording medium, and a list of all image data stored on the card recording medium is displayed on the LCD 206 by the display control unit 205.

The user operates the operation button 210 or pointing device 211 to select image data to be displayed from the list. As a result, the CPU 201 screen-displays an image for the selected image data on the LCD 206. In the image displayed on the LCD 206, coordinates corresponding to the image data are mapped, and the coordinates are input using the pointing device 211.

When input of a curve on the image displayed on the LCD 206 using the pointing device 211 is started, the CPU 201 sets an input starting point (step S101). After setting the input starting point, the CPU 201 sets a built-in counter N to zero (step S102). Then, the CPU 201 increments the counter N (step S103).

FIGS. 4A to 10C are views useful in explaining the concept of the progression of image processing, the progression of display, and the progression of face detection results when the face predictive detection process described with reference to FIGS. 3A to 3D is carried out. It should be noted that in FIGS. 4A to 10C, the progression of image processing means the progression of internal processing concept in image processing, and the progression of display means the progression of image displayed on the LCD 206.

Figures 4A, 4B:
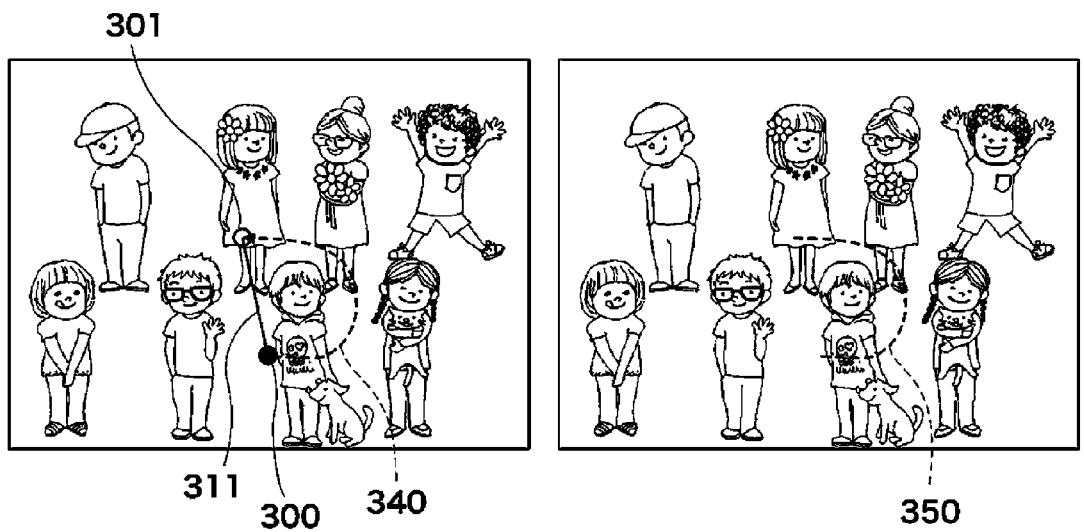

Here, in the progression of image processing, as shown in FIG. 4A, for example, an input starting point is indicated by "300", and an already-input curve is indicated by "340". In the progression of display, an already-input curve 350 is displayed on the LCD 206 as shown in FIG. 4B. It should be noted that as shown in FIG. 4C, no result is shown in the progression of face detection results.

Then, the CPU 201 determines whether or not the input curve input using the pointing device 211 is closed (step S104). When the input curve is not closed (YES in the step S104), the CPU 201 determines whether or not a predetermined time period has elapsed since a starting point or a split point was set, or a predetermined distance has been drawn (passed) with respect to absolute coordinates (step S105). It should be noted that here, as will be described later, the split point means an image processing conceptual point pointed on a curve while the curve is being input using the pointing device 211.

When the predetermined time period has not elapsed since the starting point or the split point was set, and the predetermined distance has not been drawn with respect to the absolute coordinates (NO in the step S105), the CPU 201 returns to the process in the step S104. When the predetermined time period has elapsed since the starting point or the split point was set, and the predetermined distance has been drawn with respect to the absolute coordinates (YES in the step S105), the CPU 201 sets a split point N (step S106). Then, the CPU 201 connects the starting point and the split point N together, and sets a split line N (step S107).

As show in the progression of image processing in FIG. 4A, here, a split point 301 and a split line 311 are set.

Then, the CPU 201 sets a difference between a region enclosed by the already-input curve and the split line N (a region defined by the already-input curve and the split line) and an already-set split detection region as a split detection region N (step S108). Here, the already-input curve stored values described with reference to FIG. 2 are used for the already-input curve input using the pointing device.

It should be noted that when the counter N=1, there is no already-set split detection region, and hence in the progression of image processing in FIG. 4A, a region enclosed by the already-input curve 340 and the split line 311 is set as a split detection region.

Then, the CPU 201 sets an image data region N corresponding to the split detection region N (step S109), and carries out a facial part detection process on the image data region N (step S110). Here, facial parts mean parts forming a human face, and for example, hair, eyebrows, eyes, eyeglasses, nose, mouth, ears, and beards. Then, the CPU 201 carries out a face detection process on the image data region N (step S111). It should be noted that various methods have been proposed for the facial part detection process and the face detection process, and description thereof is omitted here because they are well-known techniques.

Then, the CPU 201 determines whether or not no "incomplete facial part of an undetected face" is included in the image data region N (step S112). When any "incomplete facial part of an undetected face" is included in the image data region N (NO in the step S112), the CPU 201 stores detection information on the detected "incomplete facial part of an undetected face" in, for example, the RAM 202 (step S113). Then, the CPU 201 clears the face detection result in the image data region N (step S114). Further, the CPU 201 clears settings in the split detection region N (step S115), and returns to the process in the step S103.

Here, an "incomplete facial part of an undetected face" means a facial part that does not belong to any face in the face detection process in the step S111, and does not belong to any of already-stored face detection results.

On the other hand, when no "incomplete facial part of an undetected face" is included in the image data region N (YES in the step S112), the CPU 201 determines whether or not an already-stored incomplete facial part is included in the face detection result. When an already-stored incomplete facial part is included in the face detection result (YES in the step S116), the CPU 201 clears detection information on the already-stored incomplete facial part (step S117). Then, the CPU 201 stores the split detection region N as an already-set split detection region in the RAM 202 (step S118).

It should be noted that no already-stored incomplete facial part is included in the face detection result (NO in the step S116), the CPU 201 proceeds to the process in the step S118. Here, detection information that does not belong to the face detection result is left without being cleared among detection information on the already-stored incomplete facial parts.

Then, the CPU 201 stores a face number of a face obtained in the face detection process in the step S111 and central coordinates of the face in the RAM 202 (step S119). Then, the CPU 201 stores detected face frame coordinates corresponding to the detected face number in the RAM 202 (step S120). Thereafter, the CPU 201 controls the display control unit 205 to temporarily display on the LCD 206 a face frame for the face obtained in the face detection process in the step S111 (step S121). Then, the CPU 201 returns to the process in the step S103 and increments the counter N. It should be noted that the temporary display of the face frame in the step S121 is illustrated by a broken line, but the temporary display may be in any display form as long as full-scale display, to be displayed later, and temporary display can be distinguished from each other.

A description will now be given of the process so far with reference to FIG. 5. In the progression of image processing, a split detection region 321 is set, and a face in the split detection region 321 is detected (FIG. 5A). In the progression of display, a temporary display frame 351 for the detected face is displayed on the LCD 206 (FIG. 5B). In the progression of face detection results (FIG. 5C), the following face detection results are stored as a face number "1" in the RAM 202.

Face number=1, status=temporary, region=321, central coordinates=(x1, y1), upper left frame coordinates (x1lu, y1lu), upper right frame coordinates (x1ru, y1ru), lower right frame coordinates (x1rb, y1rb), and lower left frame coordinates (x1lb, y1lb) are stored as face detection results.

Thus, the CPU 201 repeatedly carries out the process from the step S103 up to return to the step S103 until the input curved input using the pointing device 211 is closed (NO in the step S104).

Referring now to FIGS. 6 to 8, a description will be given of the process until the input curve is closed.

Figures 6A, 6B:
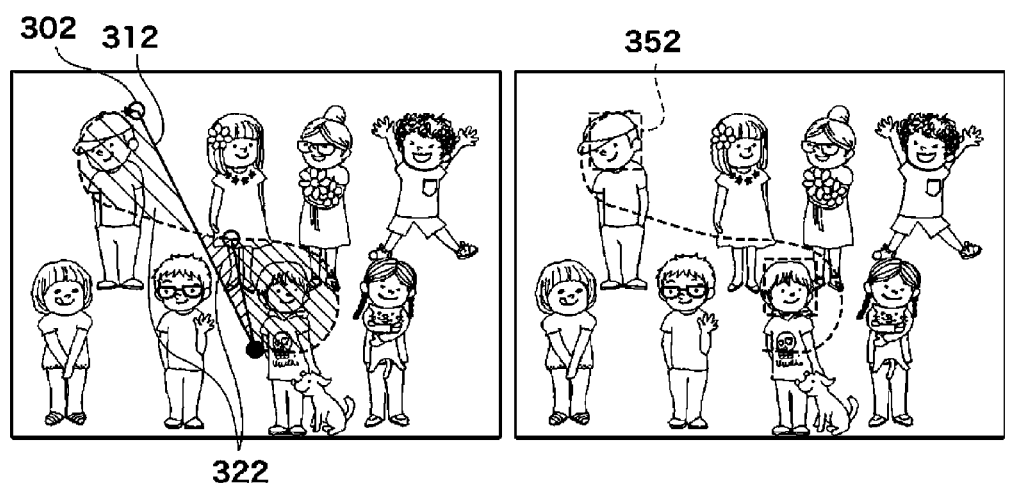

In the progression of image processing shown in FIG. 6A, a second split point 302 and a split line 312 are set, and a difference between a region enclosed by an already-input curve and the split line 312 and the already-set split detection region is set as a split detection region 322. Then, a face within the split detection region 322 is detected by a face detection process. In the progression of display shown in FIG. 6B, a temporary display frame 352 for the detected face is displayed on the LCD 206. In the progression of face detection results shown in FIG. 6C, the following face detection results are stored as a face number "2" in the RAM 202.

Face number=2, status=temporary, region=322, central coordinates=(x2, y2), upper left frame coordinates (x2lu, y2lu), upper right frame coordinates (x2ru, y2ru), lower right frame coordinates (x2rb, y2rb), and lower left frame coordinates (x2lb, y2lb) are stored as face detection results.

Figure 7A:
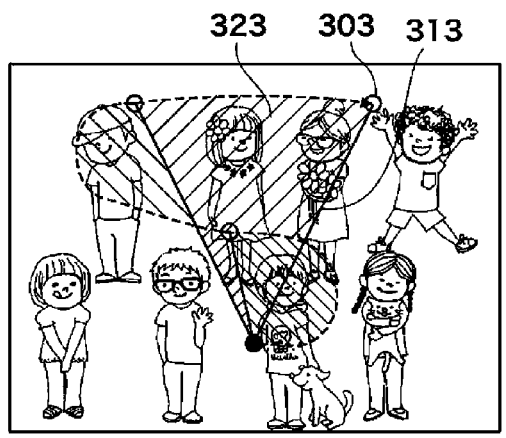
Figure 7B:
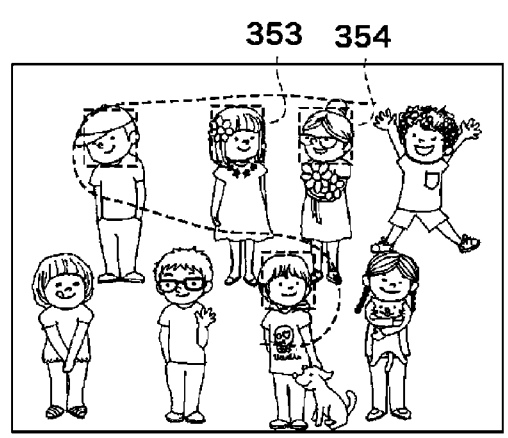

In the progression of image processing shown in FIG. 7A, a third split point 303 and a split line 313 are set, and a difference between a region enclosed by an already-input curve and the split line 313 and the already-set split detection region is set as a split detection region 323. Then, a face within the split detection region 323 is detected by a face detection process. In the progression of display shown in FIG. 7B, temporary display frames 353 and 354 for the detected faces are displayed on the LCD 206. In the progression of face detection results shown in FIG. 7C, the following face detection results are stored as face numbers "3" and "4" in the RAM 202.

Face number=3, status=temporary, region=323, central coordinates=(x3, y3), upper left frame coordinates (x3lu, y3lu), upper right frame coordinates (x3ru, y3ru), lower right frame coordinates (x3rb, y3rb), and lower left frame coordinates (x3lb, y3lb) are stored as face detection results. Further, face number=4, status=temporary, region=323, central coordinates=(x4, y4), upper left frame coordinates (x4lu, y4lu), upper right frame coordinates (x4ru, y4ru), lower right frame coordinates (x4rb, y4rb), and lower left frame coordinates (x4lb, y4lb) are stored as face detection results.

In the progression of image processing shown in FIG. 8A, a fourth split point 304 and a split line 314 are set, and a difference between a region enclosed by an already-input curve and the split line 314 and the already-set split detection region is set as a split detection region 324. In the split detection region 324, "a face and an incomplete facial part" 344 has been detected, and hence the face detection results and the settings in the split detection region 324 are cleared. Thus, the progression of display shown in FIG. 8B is the same as the progression of display shown in FIG. 7B, and in the progression of face detection results shown in FIG. 8C, no face detection result is stored in the RAM 202. Namely, the progression of face detection results shown in FIG. 8C is the same as the progression of face detection results shown in FIG. 7C.

Referring again to FIGS. 3A to 3D, when the input curve input using the pointing device 211 is closed (NO in the step S104), the CPU 201 sets an endpoint (step S122). Specifically, the CPU 201 sets a difference between a region enclosed by the already-input curve and the already-set split detection region as a split detection region N (step S123).

Then, the CPU 201 sets an image data region N corresponding to the split detection region N (step S124), and carries out a facial part detection process on the image data region N (step S125). Then, the CPU 201 carries out a face detection process on the image data region N (step S126).

Then, the CPU 201 determines whether or not no "incomplete facial part of an undetected face" is included in the image data region N (step S127). When any "incomplete facial part of an undetected face" is included in the image data region N (NO in the step S127), the CPU 201 stores detection information on the detected "incomplete facial part of an undetected face" in, for example, the RAM 202 (step S128). Then, the CPU 201 proceeds to a process in step S134, to be described later.

When no "incomplete facial part of an undetected face" is included in the image data region N (YES in the step S127), the CPU 201 determines whether or not any already-stored incomplete facial part is included in the face detection result (step S129). When any already-stored incomplete facial part is included in the face detection result (YES in the step S129), the CPU 201 clears detection information on the already-stored incomplete facial part (step S130). Then, the CPU 201 stores a face number of the face detected in the face detection process in the step S126 and the central coordinates of the face (step S131).

It should be noted that when no already-stored incomplete facial part is included in the face detection result (NO in the step S129), the CPU 201 proceeds to the process in the step S131. Here, detection information that does not belong to the face detection result is left without being cleared among detection information on the already-stored incomplete facial part.

Then, the CPU 201 stores detected face frame coordinates corresponding to the detected face number in the RAM 202 (step S132). Then, the CPU 201 temporarily displays a face frame for the face obtained in the face detection process in the step S126 (step S133).

Figure 9A:
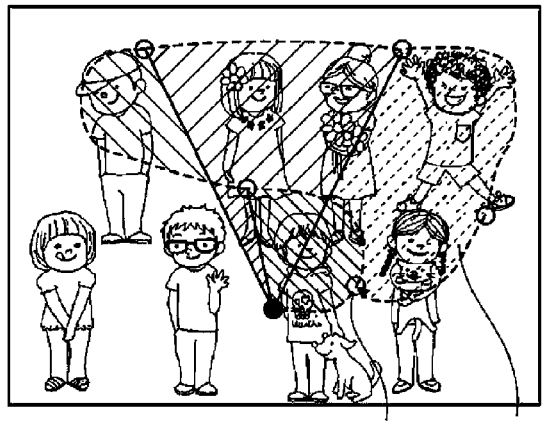
Figure 9B:
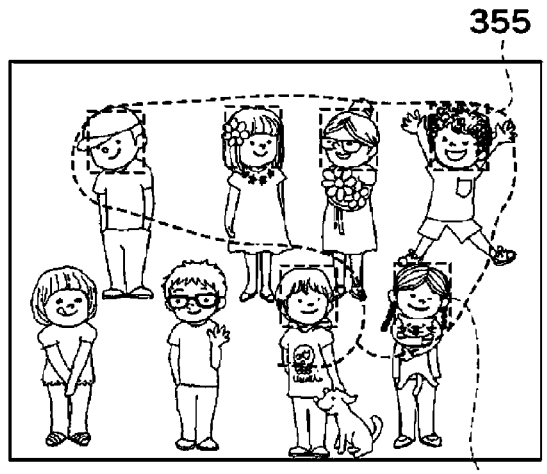

In the process so far, in the progression of image processing shown in FIG. 9A, an endpoint 305 is set, and a difference between the already-input curve and the already-set split detection region is set as a split detection region 325. Then, faces within split detection region 325 are detected by a face detection process. In the progression of display shown in FIG. 9B, temporary display frames 355 and 356 for the detected faces are displayed on the LCD 206. In the progression of face detection results shown in FIG. 9C, the following face detection results are stored as face numbers "5" and "6" in the RAM 202.

Face number=5, status=temporary, region=325, central coordinates=(x5, y5), upper left frame coordinates (x5lu, y5lu), upper right frame coordinates (x5ru, y5ru), lower right frame coordinates (x5rb, y5rb), and lower left frame coordinates (x5lb, y5lb) are stored as face detection results. Further, face number=6, status=temporary, region=325, central coordinates=(x6, y6), upper left frame coordinates (x6lu, y6lu), upper right frame coordinates (x6ru, y6ru), lower right frame coordinates (x6rb, y6rb), and lower left frame coordinates (x6lb, y6lb) are stored as face detection results.

Then, the CPU 201 erases face frame temporary displays of face numbers having central coordinates outside the region closed by the already-input curve (step S134). Then, the CPU 201 registers faces of face numbers having central coordinates inside the region closed by the already-input curve as objects (step S135), thus enabling other applications to process the faces as objects. After that, the CPU 201 changes face frame temporary displays of face numbers having central coordinates inside the region closed by the already-input curve (that is, inside the closed curve) to full-scale display frames (step S136). Namely, the CPU 201 displays full-scale display frames for faces positioned inside the closed curve.

Figure 10A:
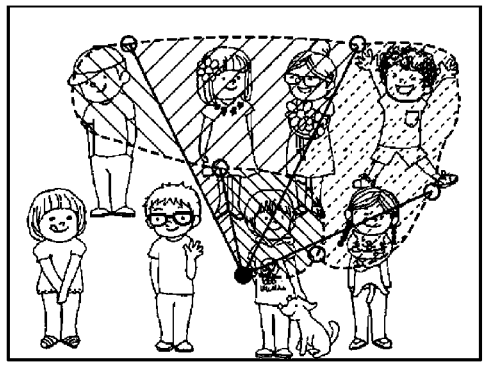
Figure 10B:
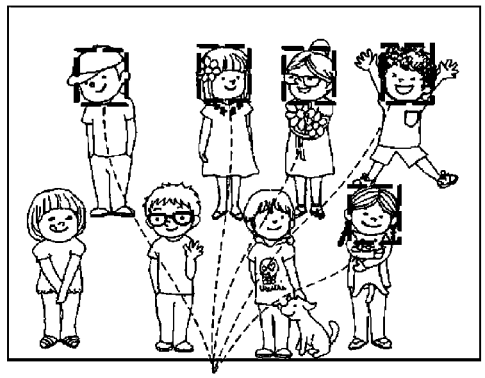

In the process so far, the progression of image processing in FIG. 10A is the same as the progression of image processing in FIG. 9A. In the progression of display in FIG. 10B, the temporary display frame 351 for the face number "1" having central coordinates outside the region closed by the already-input curve is erased from the LCD 206, and the temporary display frames 352 to 356 (first display form) are changed to a full-scale display frame 360 (second display form) (that is, displayed in an identifiable manner). In the progression of face detection results in FIG. 10C, the detection results for the face number "1" are erased, and the statuses of the face numbers "2" to "6" are changed from "temporary" to "full-scale".

It should be noted that the full-scale display frame in the step S136 is illustrated by a solid line in the figure, but the full-scale display frame may be in any display form as long as it can be distinguished from a temporary display frame.

Finally, the CPU 201 determines whether or not detection information on "incomplete facial parts of an undetected face" remains in the RAM 202 (step S137). When no detection information on "incomplete facial parts of an undetected face" does not remain in the RAM 202 (NO in the step S137), the CPU 201 terminates the process. In this way, the display for enabling a target selected with predetermined timing to be identified is updated until the selection of a target is determined.

On the other hand, when detection information on "incomplete facial parts of an undetected face" remains in the RAM 202 (YES in the step S137), the CPU 201 determines that a face is laid across the inside and outside of the region closed by the input curve input using the pointing device 211. Then, the CPU 201 controls the display control unit 205 to display a face detection omission warning on the LCD 206 (step S138), and terminates the process.

Thus, according to the first embodiment, in a state where coordinates corresponding to image data are input using the pointing device, a face detection process (predicting process) is carried out step by step, and detection results can be immediately displayed. Further, when the input of the coordinates using the pointing device is completed, the face detection results can be determined, and faces can be registered as objects at the same time. Namely, while a curve is being drawn using the pointing device, frames are displayed for faces likely to be selected by the curve, and therefore, the curve can be drawn while which face will be selected is ascertained. Thus, when a frame for a face undesired to be selected is displayed while the user is drawing a curve, the user can exclude the face that has been selected and the frame therefor has been displayed from a selection target by adjusting the subsequent drawing of the curve. Moreover, because a curve is drawn, and the selection of a face is determined in response to the curve becoming a closed curve, two operations consisting of selection of a plurality of faces and determination of the selection can be performed in a single operation of drawing the curve, and hence the ease of operation can be enhanced. Moreover, because faces are registered as objects in response to a drawn curve becoming a closed curve, the objects can be transferred to other applications at high speed. The other applications can perform image processing such as mosaic processing and color correction processing on the faces registered as the objects.

Next, a description will be given of a face detection apparatus according to a second embodiment of the present invention.

An arrangement of the face detection apparatus according to the second embodiment is the same as that of the face detection apparatus appearing in FIG. 1, and therefore, description thereof is omitted.

In the first embodiment described above, a difference between a region enclosed by an already-input curve and a split line and an already-set split detection region is set as a split detection region, and a face within the split detection region is detected, whereas in the second embodiment, a split detection region is enlarged to detect a face.

Figure 11A:
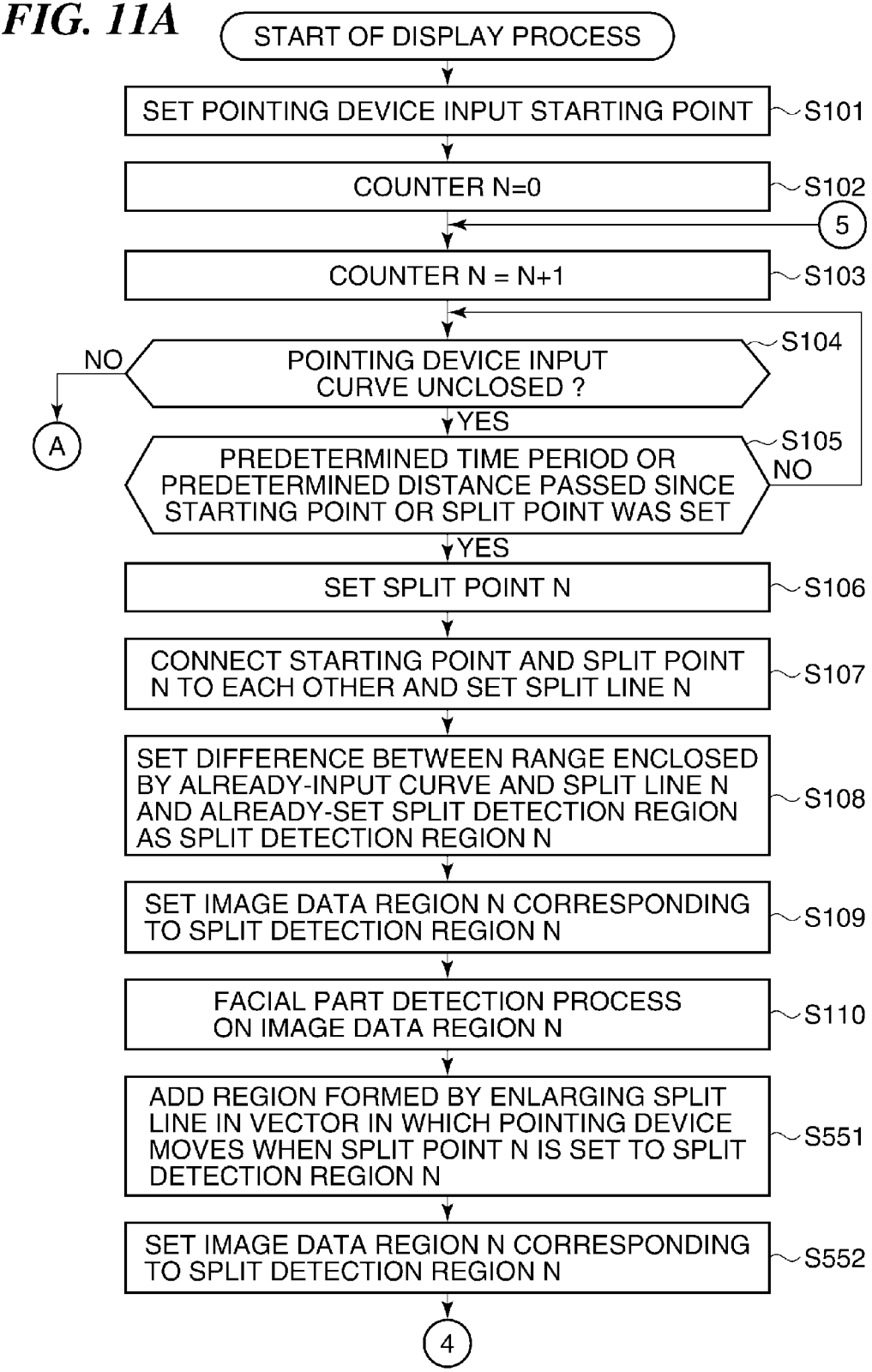

FIGS. 11A and 11B are flowcharts useful in explaining a process to display face detection results when a curve of coordinates corresponding to image data is drawn using the pointing device appearing in FIG. 1 in the second embodiment of the present invention. It should be noted that in FIGS. 11A and 11B, the same processes as the processes shown in FIGS. 3A to 3D are denoted by the same reference numerals, and description thereof is omitted.

In the second embodiment, after carrying out a facial part detection process on an image data region N in step S110, the CPU 201 adds a region formed by extending a split line in a vector in which the pointing device moves at the time when a split point N is set (that is, a drawing direction) to the split detection region N to enlarge the split detection region N (step S551). Then, the CPU 201 sets an image data region N corresponding to the enlarged split detection region N (enlarged split region) (step S552). After that, in the step S111 as described above with reference to FIG. 3B, the CPU 201 carries out a face detection process on the image data region N.

After carrying out the face detection process, the CPU 201 subtracts a region formed by enlarging the split line in the vector in which the pointing device moves at the time when the split point N is set from the split detection region N to return the split detection region N to its original state (step S553). Then, the CPU 201 carries out the processes in the step S112 to S121 described above with reference to FIG. 3B. It should be noted that when the input curve input using the pointing device 211 is closed in the step S104, the CPU 201 carries out the processes in the step S122 to S138 described above with reference to FIGS. 3C and 3D.

FIGS. 12 to 16 are views useful in explaining the concept of the progression of image processing, the progression of display, and the progression of face detection results when the face predictive detection process described with reference to FIGS. 11A to 11B is carried out. It should be noted that here, image data is the same as that in the first embodiment, and hence face detection results corresponding to face numbers are the same as those in the first embodiment.

As described above with reference to FIG. 4, the split point 301 and the split line 311 are set, and the region enclosed by the already-input curve 340 and the split line 311 is set as the split detection region. Then, the already-input curve 350 is displayed on the LCD 206.

Figures 12A, 12B:
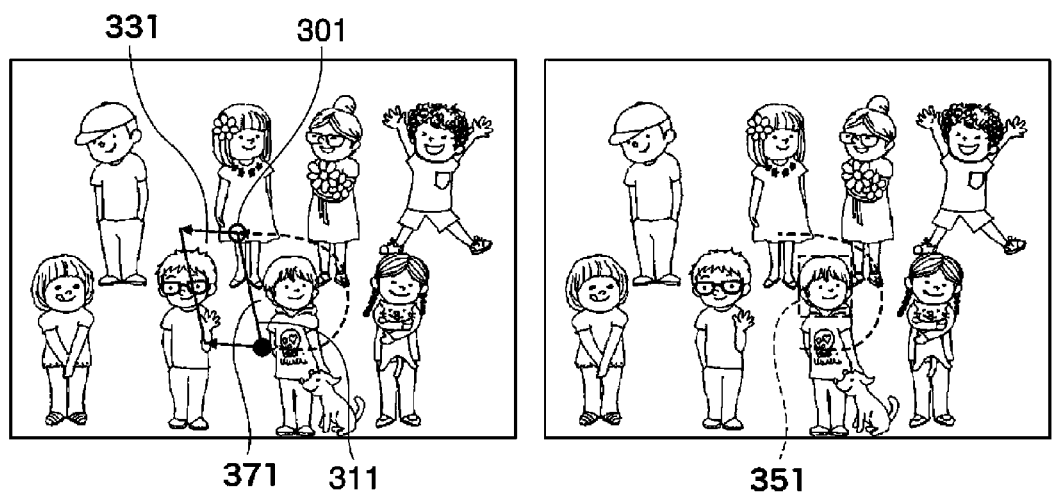

Then, in the progression of image processing in FIG. 12A, a split detection region 371 is set, and a region 331 formed by enlarging the split line 311 in a vector in which the pointing device moves at the time when the split point 301 is set is added to the split detection region 371 to obtain an enlarged split detection region. As a result, a face in the split detection region 371+the enlarged region 331 is detected. Then, in the progression of display in FIG. 12B, a temporary display frame 351 for the detected face is displayed on the LCD 206. In the progression of face detection results in FIG. 12C, face detection results for a face number "1" are stored in the RAM 202.

Although parts of another face are laid across the enlarged region 331, the facial part detection process is carried out on the split detection region 371 before the split detection region is enlarged, and hence the detected parts are not stored as "incomplete facial parts of an undetected face".

In the progression of image processing in FIG. 13A, a split detection region 372 is set, and a region 332 formed by enlarging the split line 312 in a vector in which the pointing device moves at the time when the split point 302 is set is added to the split detection region 372 to obtain an enlarged split detection region. As a result, a face in the split detection region 372+the enlarged region 332 is detected. Then, in the progression of display in FIG. 13B, a temporary display frame 352 for the detected face is displayed on the LCD 206. In the progression of face detection results in FIG. 13C, face detection results for a face number "2" are stored in the RAM 202.

Figure 14A:
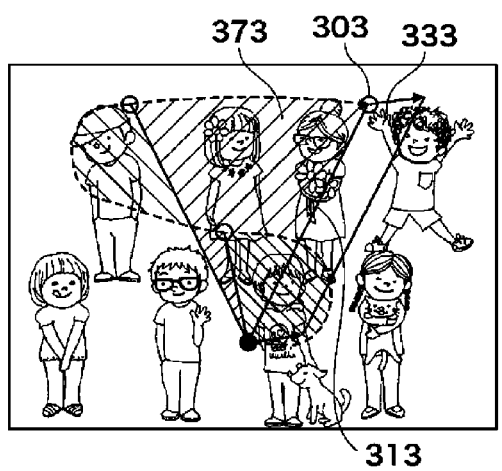
Figure 14B:
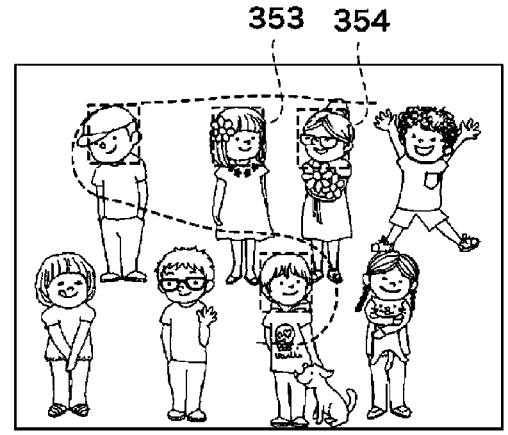

In the progression of image processing in FIG. 14A, a split detection region 373 is set, and a region 333 formed by enlarging the split line 313 in a vector in which the pointing device moves at the time when the split point 303 is added to the split detection region 373 to obtain an enlarged split detection region. As a result, faces in the split detection region 373+the enlarged region 333 are detected. Then, in the progression of display in FIG. 14B, temporary display frames 353 and 354 for the detected faces are displayed on the LCD 206. In the progression of face detection results in FIG. 14C, face detection results for face numbers "3" and "4" are stored in the RAM 202.

Figures 15A, 15B:
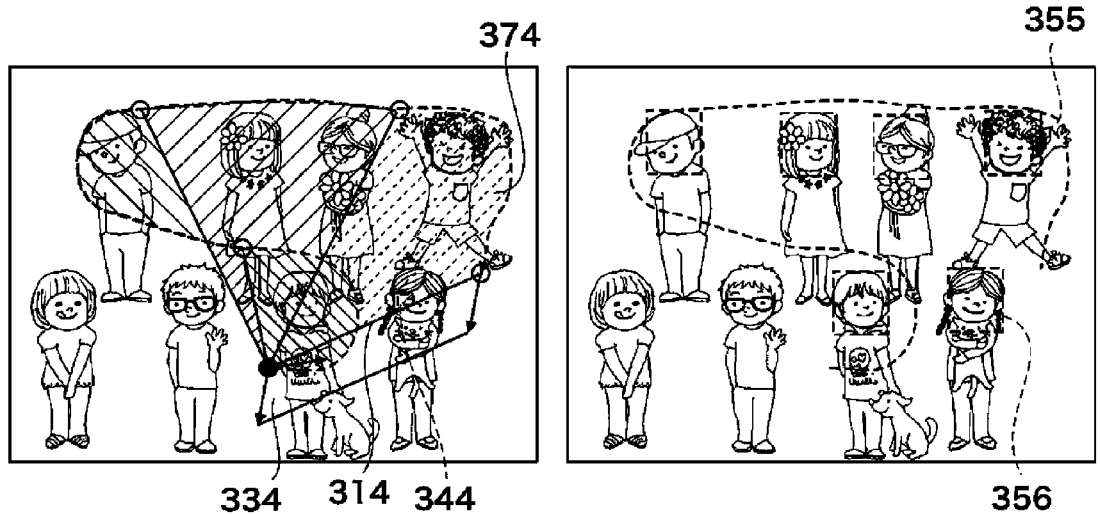

In the progression of image processing in FIG. 15A, a split detection region 374 is set, and a region 334 formed by enlarging the split line 314 in a vector in which the pointing device moves at the time when the split point 304 is set is added to the split detection region 374 to obtain an enlarged split detection region. As a result, faces in the split detection region 374+the enlarged region 334 are detected. Then, in the progression of display in FIG. 15B, temporary display frames 355 and 356 for the detected faces are displayed on the LCD 206. In the progression of face detection results in FIG. 15C, face detection results for face numbers "5" and "6" are stored in the RAM 202.

It should be noted that although in FIG. 15A, incomplete facial parts 344 are detected once in the split detection region 374, a face including the incomplete facial parts 344 is detected by the subsequent face detection process. For this reason, it is determined that the incomplete facial parts 344 are not "incomplete facial parts of an undetected face", and they are not stored as detection information on incomplete facial parts of an undetected face.

Figure 16A:
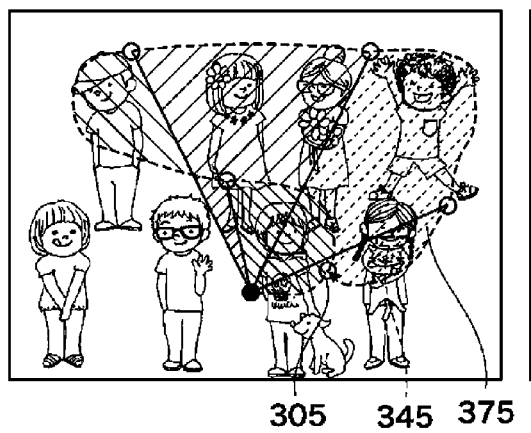
Figure 16B:
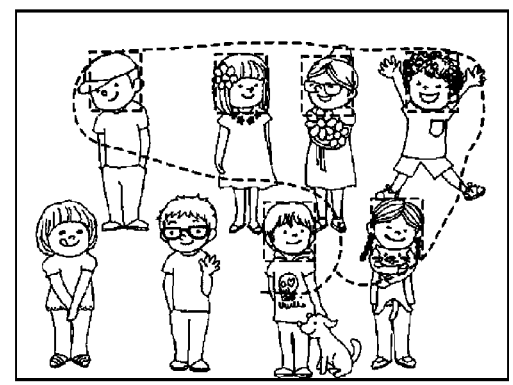

In the progression of image processing in FIG. 16A, an endpoint 305 and a split detection region 375 are set. In the split detection region 375, a plurality of facial parts 345 are detected, but they are the facial parts of already-detected faces, and hence they are not stored as detection information on "incomplete facial parts of undetected faces".

Thus, in the second embodiment, face numbers up to "6" can be detected when an input curve input using the pointing device is in the state shown in FIG. 15A. Namely, in the second embodiment, when there is any face laid across a split line when the split line is set, a split detection region is enlarged to detect the face, and thus face predictive detection for an input curve can be efficiently carried out.

As described above, in the embodiments of the present invention, image data, that is, a drawing line (curve) drawn according to an image is drawn using the pointing device, and a face predictive detection process is carried out step by step until the drawing line is closed. While the drawing line is being drawn, face predictive detection results are immediately screen-displayed. Further, when the drawing line is closed (that is, the drawing line becomes a closed curve), only face detection results in a region enclosed by the drawing line (a region inside the closed curve) are screen-displayed. Thus, selection processing can be quickly carried out when a desired face is selected according to face detection results, and image processing is carried out on the face.

Although in the above description, the face detection apparatus is applied to a printing apparatus, the face detection apparatus may be applied to not only a printing apparatus, but also any apparatus as long as the apparatus detects facial parts and faces by inputting coordinates to given image data.

Although in the above embodiments, a face detection process is carried out while a drawing line is being drawn, a process to detect faces in image data may be carried out in advance, and coordinate data on the position of the faces may be recorded in advance. In this case, while a drawing line is being drawn, detection frames for faces are displayed based on coordinates data on the recorded faces, and face objects are registered. Moreover, the functions of the above described embodiments may be a control method, which may be executed by the face detection apparatus. Also, a control program having the functions of the above described embodiments may be executed by a computer which the face detection apparatus has.

On this occasion, each of the control method and the control program has at least a drawing step, a region forming step, a target detecting step, and a display control step. It should be noted that the control program is recorded in, for example, a computer-readable recording medium.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-025884 filed Feb. 9, 2011, which is hereby incorporated by reference herein in its entirety.

What is claimed is:

1. A target selection apparatus that selects a target from image data including a plurality of targets, comprising:
    a display control unit configured to display an image corresponding to the image data on a display unit;
    a drawing unit configured to draw a drawing line on the image displayed on the display unit; and
    a selection unit configured to select the target included in the image data based on the drawing line drawn by said drawing unit,
    wherein in response to the drawing line drawn by said drawing unit becoming a closed curve, the target selected by said selection unit is determined, and
    wherein said selection unit comprises:
    a region forming unit that, when the drawing line drawn by said drawing unit does not form the closed curve, sets a point on the drawing line to form a split detection region defined by a split line connecting a starting point of the drawing line and the point together and the drawing line; and
    a target detection unit that detects whether there is the target in the split detection region,
    wherein when the target is detected by said target detection unit, said display control unit displays the target on the display unit in a first display form, and when the drawing line becomes the closed line, said display control unit displays the target on the display unit in a second display form different from the first display form to determine the target.

2. A target selection apparatus according to claim 1, wherein based on the drawing line drawn by said drawing unit, said display control unit displays the target selected by said selection unit in an identifiable manner.

3. A target selection apparatus according to claim 1, wherein until selection of the target by said selection unit is determined, said display control unit continues to update display for making the selected target identifiable with predetermined timing.

4. A target selection apparatus according to claim 1, wherein said display control unit displays a temporary display frame indicative of the target on the display unit in the first display form, and in the second display form, changes the temporary display frame to a full-scale display frame differing in display form from the temporary display frame.

5. A target selection apparatus according to claim 1, wherein when a predetermined time period has elapsed or the drawing line has been drawn a predetermined distance since the starting point or the point was set, said region forming unit sets another point on the drawing line.

6. A target selection apparatus according to claim 1, wherein when another point is set on the drawing line, said region forming unit sets, as another split detection region, a difference between a region that is defined by another split line connecting the other point and the starting point together and the drawing line and the split detection region that has already been set.

7. A target selection apparatus according to claim 1, further comprising a storage unit configured to store coordinates on the screen for the target for which the temporary display frame is displayed.

8. A target selection apparatus according to claim 1, further comprising a clear unit configured to, when said target detection unit detects, in the split detection region, a part constituting the target that does not belong to the target, and does not belong to targets already detected before the target is detected, clear target detection results in the split detection region and settings in the split detection region.

9. A target selection apparatus according to claim 1, wherein said region forming unit adds a region formed by enlarging the split line in a vector indicative of a direction in which the drawing line is drawn to a region defined by the starting point and the split line to obtain the split detection region.

10. A target selection apparatus according to claim 1, wherein the target is a human face, and parts constituting the target are facial parts indicative of hair, eyebrows, eyes, eyeglasses, nose, mouth, ears, or beards that are parts of the face.

11. A control method for a target selection apparatus that selects a target from image data including a plurality of targets, comprising:
    a display control step of displaying an image corresponding to the image data on a display unit;
    a drawing step of drawing a drawing line on the image displayed on the display unit; and
    a selection step of selecting the target included in the image data based on the drawing line drawn in said drawing unit,
    wherein in response to the drawing line drawn by said drawing step becoming a closed curve, the target selected in said selection unit is determined, and
    wherein said selection step comprises:
    setting, when the drawing line does not form the closed curve, a point on the drawing line to form a split detection region defined by a split line connecting a starting point of the drawing line and the point together and the drawing line; and
    detecting whether there is the target in the split detection region,
    wherein when the target is detected, the target is displayed on the display unit in a first display form, and when the drawing line becomes the closed line, the target is displayed on the display unit in a second display form different from the first display form to determine the target.

12. A computer-readable non-transitory storage medium storing a control program for implementing a control method used for a target selection apparatus that selects a target from image data including a plurality of targets, the method comprising:
- a display control step of displaying an image corresponding to the image data on a display unit;
- a drawing step of drawing a drawing line on the image displayed on the display unit; and
- a selection step of selecting the target included in the image data based on the drawing line drawn in the drawing unit,
- wherein in response to the drawing line drawn by the drawing step becoming a closed curve, the target selected in the selection unit is determined, and
- wherein said selection step comprises:
- setting, when the drawing line does not form the closed curve, a point on the drawing line to form a split detection region defined by a split line connecting a starting point of the drawing line and the point together and the drawing line; and
- detecting whether there is the target in the split detection region,
- wherein when the target is detected, the target is displayed on the display unit in a first display form, and when the drawing line becomes the closed line, the target is displayed on the display unit in a second display form different from the first display form to determine the target.

13. A target detection apparatus that detects a target from image data including a plurality of targets, comprising:
- a display control unit configured to display an image corresponding to the image data on a display unit;
- a drawing unit configured to draw a drawing line on the image displayed on the display unit; and
- a detection unit configured to detect the target included in the image data based on the drawing line,
- wherein the detection unit is configured to detect the target included in the image data before the drawing line becomes a closed curve.

14. A control method for a target detection apparatus that detects a target from image data including a plurality of targets, comprising:
- displaying an image corresponding to the image data on a display unit;
- drawing a drawing line on the image displayed on the display unit; and
- detecting the target included in the image data based on the drawing line,
- wherein the target is detected before the drawing line becomes a closed curve.

15. A computer-readable non-transitory storage medium storing a control program for implementing a control method used for a target detection apparatus that detects a target from image data including a plurality of targets, the method comprising:
- displaying an image corresponding to the image data on a display unit;
- drawing a drawing line on the image displayed on the display unit; and
- detecting the target included in the image data based on the drawing line,
- wherein the target is detected before the drawing line becomes a closed curve.

* * * * *